United States Patent [19]
Andreoli et al.

[11] Patent Number: 5,225,649
[45] Date of Patent: Jul. 6, 1993

[54] DEVICE FOR TRANSVERSELY CUTTING LENGTHS OF A STRIP TRAVELING CONTINUOUSLY ALONG A PREDETERMINED ROUTE

[75] Inventors: Paolo Andreoli; Giulio Barbieri, both of Bologna; Bruno Belvederi, S. Martino di Monte S. Pietro, all of Italy

[73] Assignee: G.D Societa' per Azioni, Bologna, Italy

[21] Appl. No.: 723,933

[22] Filed: Jul. 1, 1991

[30] Foreign Application Priority Data

Jul. 10, 1990 [IT] Italy .................. 3584 A/90

[51] Int. Cl.⁵ ............................................ B23K 26/14
[52] U.S. Cl. .................... 219/121.67; 219/121.74; 219/121.75; 219/121.8; 219/121.84
[58] Field of Search ............ 219/121.67, 121.72, 219/121.82, 121.75, 121.81, 121.74, 121.7, 121.71, 121.81, 121.68, 121.69, 121.84

[56] References Cited

U.S. PATENT DOCUMENTS 4,535,218 8/1985 Krause et al. ............... 219/121.68

FOREIGN PATENT DOCUMENTS

0140663A1 8/1985 European Pat. Off. .
1235653 6/1971 United Kingdom .

Primary Examiner—C. L. Albritton
Attorney, Agent, or Firm—Marshall, O'Toole, Gerstein, Murray & Bicknell

[57] ABSTRACT

A device for cutting a strip fed continuously on a roller through a cutting station where a series of at least partial transverse cuts are made successively in the strip by a cutting unit. On the cutting unit, a hollow rotary drum receives a laser beam emitted by a laser source, and focuses the beam at at least one point which, as the drum rotates, moves along an annular trajectory, the plane of which intersects the route of the strip at the cutting station and forms a given angle with a line intersecting the route of the strip.

17 Claims, 3 Drawing Sheets

DEVICE FOR TRANSVERSELY CUTTING LENGTHS OF A STRIP TRAVELING CONTINUOUSLY ALONG A PREDETERMINED ROUTE

BACKGROUND OF THE INVENTION

The present invention relates to a device for transversely cutting lengths of a strip traveling continuously along a predetermined route.

For cutting lengths of sheet material, a strip of the material traveling continuously along a predetermined route is usually cut transversely and at least partially by feeding the strip through a cutting device comprising two rollers, one fitted with a blade and the other with a cutting block or anvil, and by rotating the rollers in opposite directions so that the blade cooperates at regular intervals with the cutting block or anvil for cutting the strip.

One drawback of known cutting devices of the aforementioned type is that they are relatively noisy, due to the blade necessarily striking the cutting block or anvil when cutting the strip. Moreover, continual contact between the blade and the cutting block or anvil results in rapid wear and, consequently, frequent sharpening of the blade.

SUMMARY OF THE INVENTION

It is an object of the present invention to provide a device for cutting continuously-moving strips, designed to overcome the aforementioned drawbacks.

According to the present invention, there is provided a device for transversely and at least partially cutting a strip traveling continuously along a predetermined route, said device comprising means for feeding and guiding said strip along said route and through a cutting station; and a cutting unit for successively making a series of at least partial transverse cuts through said strip; characterised by the fact that said cutting unit comprises a laser source for emitting a main laser beam; a cutting head; and first supporting means to which said cutting head is connected so as to rotate about an axis substantially parallel to said beam; said cutting head comprising reflecting means for receiving said beam and forming at least one reflected transverse beam; lens means for focusing said reflected beam at a focal point; and second means for supporting said reflecting means and said lens means; said second supporting means rotating about said axis so as to move said focal point along an annular trajectory, the plane of which intersects the route of said strip at said cutting station, and forms a given angle with a line intersecting the route of said strip.

According to one embodiment of the device described above, said feeding and guide means preferably comprise a suction roller for feeding the strip through said cutting station; said roller having peripheral grooves over which the strip extends longitudinally at said cutting station.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
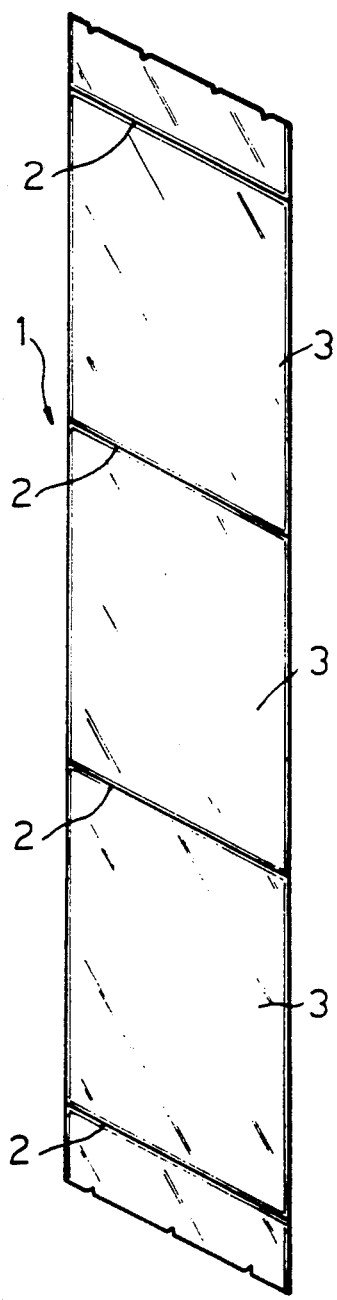
FIGS. 1 to 3 show partial views in perspective of particular types of strip cut using the device according to the present invention.
Figure 2:
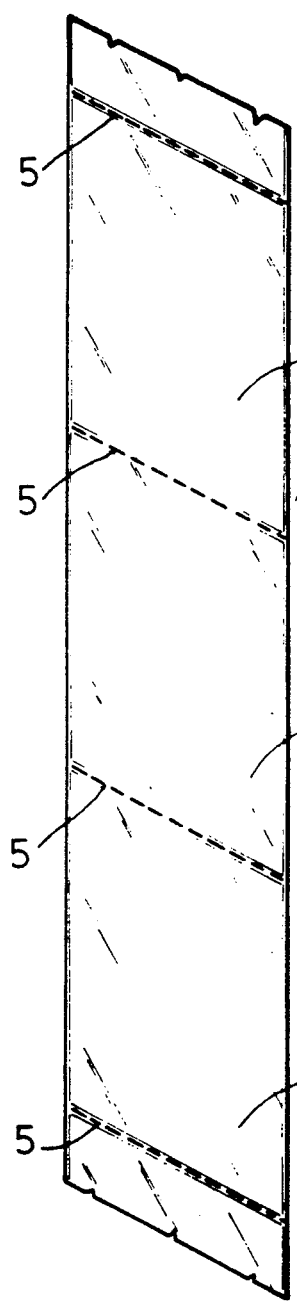
Figure 3:
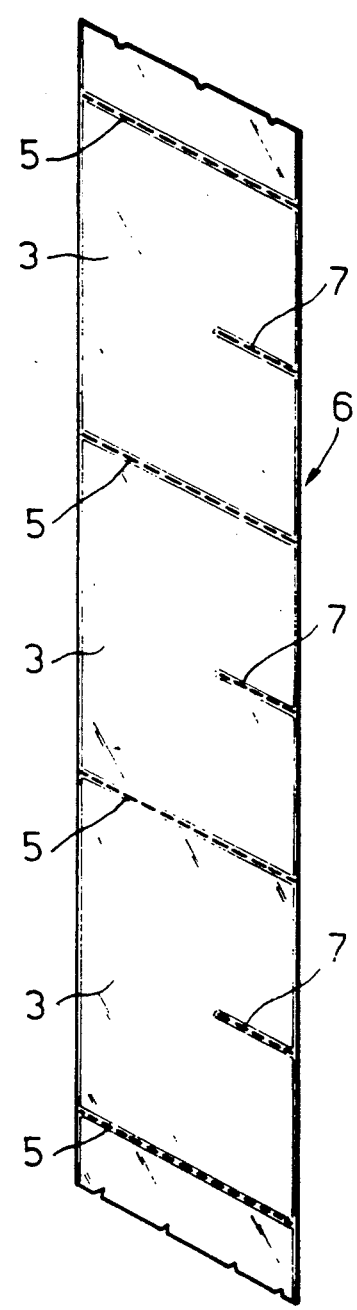

FIGS. 1 to 3 show three strips 1, 4 and 6, the first having continuous transverse cuts 2 dividing it into fixed lengths 3; the second having perforated transverse cuts 5 defining said lengths 3; and the third having perforated transverse cuts 5 and, between adjacent cuts 5, a partial perforated cut 7 defining a rip-off line which, when joined to a further rip-off line (not shown) directed axially along length 3, provides for subsequently removing a portion of length 3.

Figure 4:
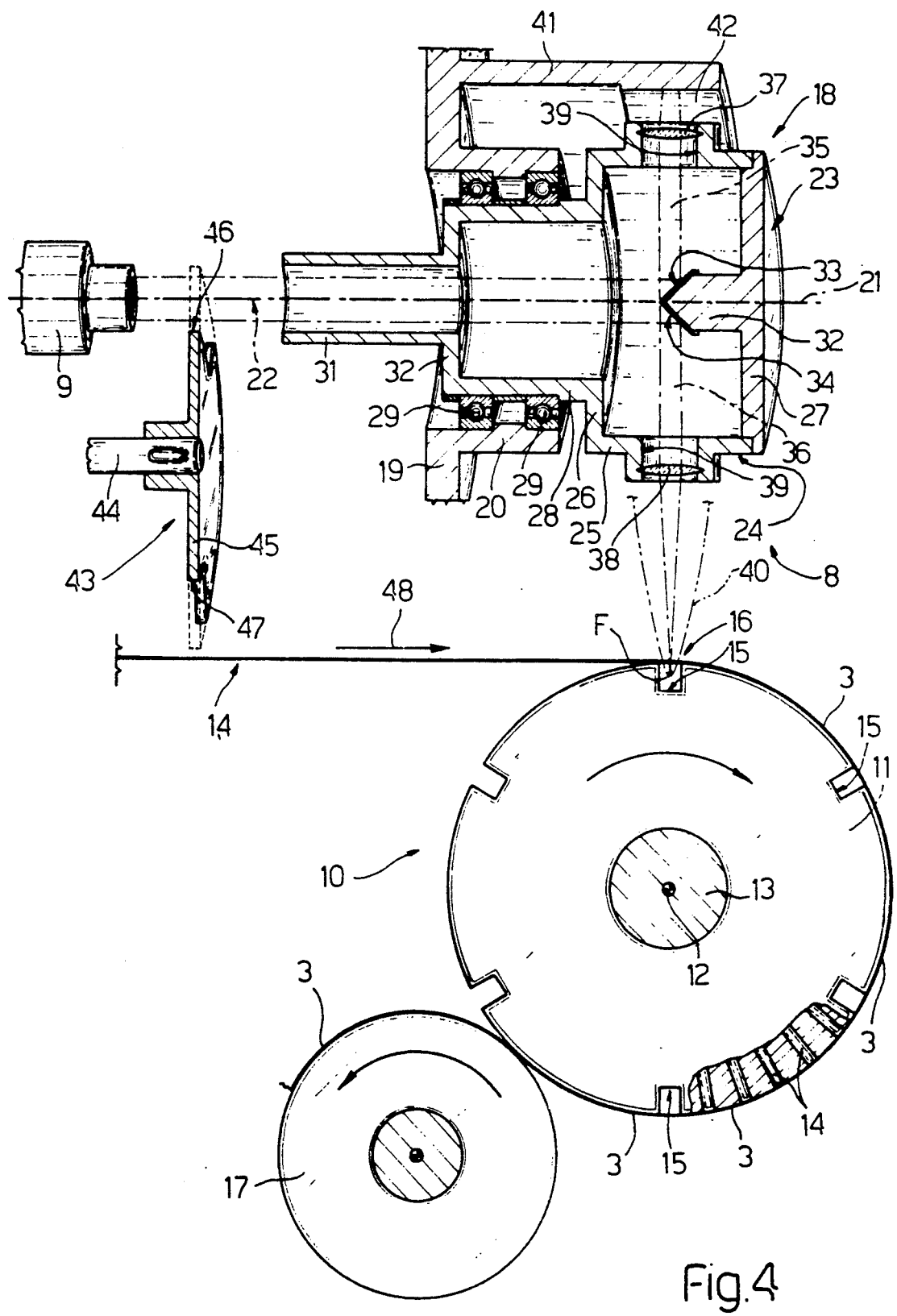
FIG. 4 shows a schematic axial section of a first embodiment of the device according to the present invention.

As shown in FIG. 4, strips 1 and 4 are cut by a device 8 comprising a laser source 9 consisting of a continuous laser source for continuous transverse cuts 2, or an electronically pulsated laser source for perforated transverse cuts 5.

On cutting device 8, strip 1 or 4 is fed continuously by a feed device 10 comprising a roller 11 turned, by drive means not shown, about the axis 12 of shaft 13. For feeding strip 1 or 4, the outer periphery of roller 11 presents a number of radial openings 14 communicating in known manner (not shown) with a known suction system (not shown). Roller 11 also presents a number of peripheral grooves 15 parallel to axis 12 and equally spaced about roller 11 at intervals equal to the required lengths 3.

Roller 11 feeds strip 1 or 4 through a cutting station 16 wherein it is cut into lengths 3, which are fed successively by roller 11 on to a tangent output roller 17 also having known suction means (not shown).

Cutting device 8 comprises a cutting unit 18 in turn comprising, in addition to laser source 9, a support consisting, in the example shown, of a wall 19 fitted through which a cylindrical coupling 20, the axis 21 of which coincides with the axis of a laser beam 22 emitted by source 9.

Coupling 20 is fitted through with a rotary cutting head 23 rotated by actuating means (not shown) at a given speed about axis 21, and comprising a hollow cylindrical drum 24 located outside and on the opposite side of source 9 in relation to coupling 20. Drum 24 is coaxial with axis 21, and presents a cylindrical lateral wall 25 closed, on the side facing coupling 20, by a first flat annular wall 26, and, on the opposite side, by a second continuous flat wall 27 parallel to wall 26 and perpendicular to axis 21. From the inner periphery of annular wall 26, there extends outwards a tubular appendix 28 coaxial with axis 21 and connected to the inner surface of coupling 20 via the interposition of bearings 29. On the end facing source 9, appendix 28 is closed by an annular wall 30, from the inner periphery of which there extends, towards source 9, a further tubular appendix 31, the open free end of which faces source 9 and forms the inlet of beam 22 into cutting head 23.

Wall 27 presents an inner projection 32 coaxial with axis 21 and defined, on the side facing source 9, by two flat reflecting surfaces 33 and 34 joined to produce a rectangular dihedral, the edge of which, facing source 9, intersects axis 21. Both surfaces 33 and 34 form a substantially 45° angle with axis 21, so as to intercept respective halves of beam 22 and define respective reflected beams 35 and 36 directed radially outwards on to respective focusing lenses 37 and 38 mounted in respective radial holes 39 through wall 25.

Lenses 37 and 38 focus respective reflected beams 35 and 36 at respective focal points F, which, due to the rotation of cutting head 23 about axis 21, travel along a trajectory 40 interfering with the route of strip 1 or 4 at cutting station 16.

Figure 5:
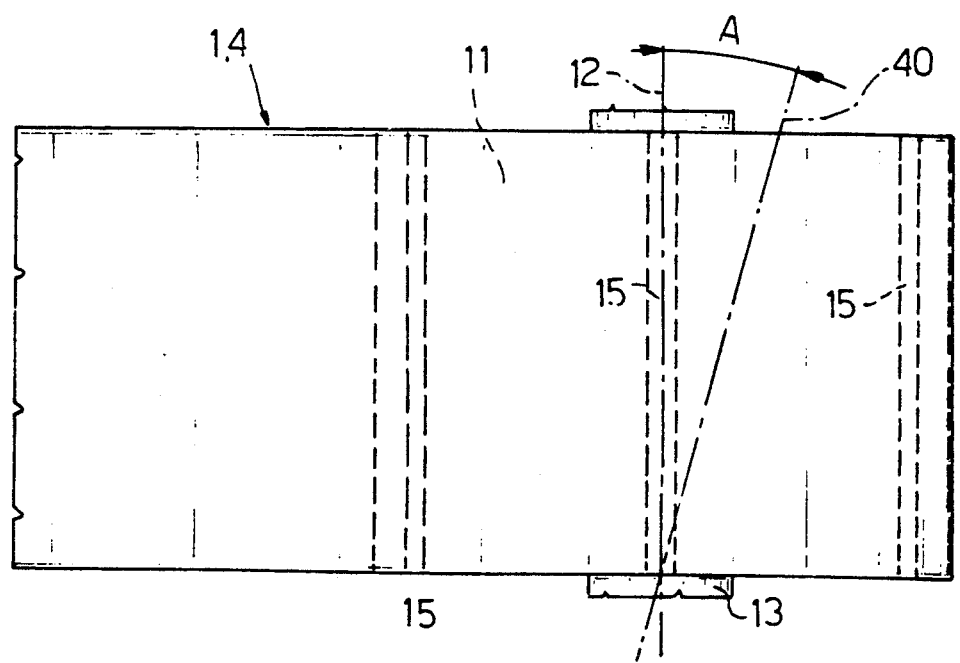
FIG. 5 shows a schematic plan view of a detail on the FIG. 4 device.

As shown in FIG. 5, trajectory 40 lies in a plane perpendicular to axis 21 and forming an angle A with a generating line of roller 11 across axis 21, i.e. with the axis of any one of grooves 15, the sine of which angle A is substantially equal to the ratio between the traveling speed of strip 1 or 4 and the speed at which each focal point F travels along trajectory 40. Also, the speed ratio of roller 11 and cutting head 23 is such that a focal point F traveling along trajectory 40 reaches station 16 simultaneously with the end of a groove 15 located upstream in relation to the traveling direction of focal point F along trajectory 40.

Over coupling 20, wall 19 is fitted with a substantially horizontal bracket 41, the free end of which is fitted integral with a curved plate 42 coaxial with and outside wall 25, and diametrically opposite station 16. According to a first variation (not shown), plate 42 acts as a dimming device enclosing substantially the whole of cutting head 23 and having a side window (not shown) facing station 16 and wide enough to allow each reflected or deflected beam 35, 36 to reach strip 1 or 4 for making a respective cut 2 or 5.

Alternatively, as shown in FIG. 4, plate 42 encloses head 23 over an arc substantially equal to that by which each beam 35 and 36 cuts strip 1 or 4, and beam 22 is intercepted, between source 9 and cutting unit 18, by a dimming device 43 comprising a drive shaft 44 parallel to axis 21 and turned by actuating means (not shown) at the same speed as cutting head 23. Dimming device 43 also comprises a disc 45, a peripheral portion of which intercepts beam 22 and presents two diametrically-opposed radial windows or recesses 46 and 47 through which beam 22 passes for as long as one of focal points F travels over said cutting angle through cutting station 16.

According to a further variation not shown, projection 32 presents one reflecting surface 33, 34, and disc 45, if provided, presents one window 46, 47, and turns, together with cutting unit 18, at twice the speed of the FIG. 4 embodiment.

With reference to the FIG. 4 embodiment, in actual use, device 10 feeds strip 1 or 4 in the direction of arrow 48 and, in the example shown, horizontally on to roller 11, strip 1 or 4 traveling at constant speed along a substantially straight route tangent to roller 11. The rotation speed of head 23 and roller 11 are regulated so that, for each turn of roller 11 equal to the distance between two adjacent grooves 15, head 23 turns 180° about axis 21.

Figure 6:
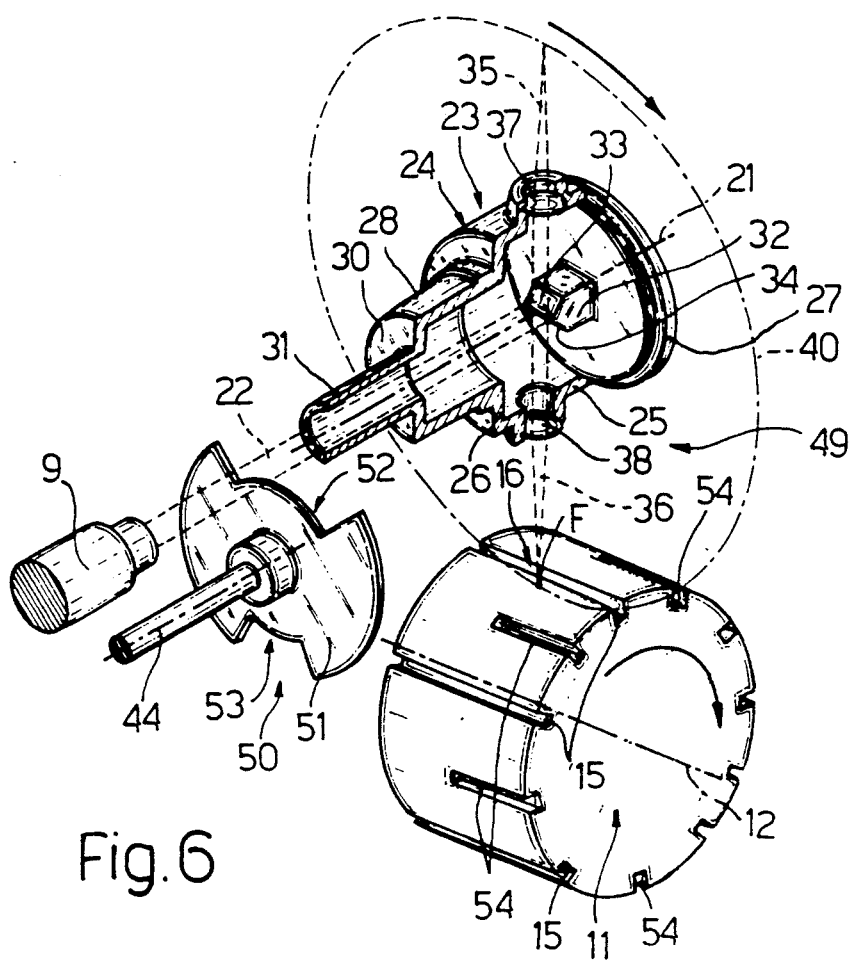
FIG. 6 shows a partially sectioned view in perspective, with parts removed for simplicity, of a second embodiment of the device according to the present invention.

When head 23 is turned about axis 21, focal points F travel along trajectory 40, the plane of which, as already stated, is such as to enable each focal point F to travel along a respective groove 15 moving at constant speed with roller 11, so as to make successive cuts 2 or 5 dividing strip 1 or 4 into lengths 3. As soon as each focal point F abandons respective groove 15, beam 22 is intercepted by dimming device 43 or, alternatively, beam 35, 36 is intercepted by plate 42. The FIG. 6 embodiment relates to a cutting device 49 which, in place of dimming device 43 on cutting device 8, comprises a dimming device 50, the disc 51 of which presents two peripheral openings 52 and 53 of different size for making cuts 5 and 7 in strip 6, and turns at twice the speed of disc 45, while roller 11 presents a partial groove 54 between each pair of adjacent grooves 15.

Cutting device 49 operates in exactly the same way as device 8, and therefore, requires no further explanation.

We claim:

1. A device (8 or 49) for transversely and at least partially cutting a strip (1 or 4 or 6) traveling continuously along a predetermined route, said device (8 or 49) comprising means (10) for feeding and guiding said strip (1 or 4 or 6) along said route and through a cutting station (16); said feeding and guiding means defining a plurality of grooves (15, 54) over which the strip (1, 4, 6) extends longitudinally at said cutting station (16); and a cutting unit (18) for successively making a series of at least partial transverse cuts (2, or 5, 7) through said trip (1 or 4 or 6); said cutting unit (18) comprising a laser source (9) for emitting a main laser beam (22); a cutting head (23); and first supporting means (19) to which said cutting head (23) is connected so as to rotate about an axis (21) substantially parallel to said beam (22); said cutting head (23) comprising reflecting means (33, 34) for receiving said beam (22) and forming at least one reflected transverse beam (35, 36); lens means (37, 38) for focusing said reflected beam (35, 36) at a focal point (F); and second means (24) for supporting said reflecting means (33, 34) and said lens means (37; 38); said second supporting means (24) rotating about said axis (21) so as to move said focal point (F) along an annular trajectory (40), the plane of which intersects the route of said strip (1 or 4 or 6) at said cutting station (16), and forms a given angle with a line intersecting the route of said strip (1 or 4 or 6).

2. A device as claimed in claim 1, characterised by the fact that said reflecting means comprise two reflecting surfaces (33, 34) perpendicular to each other and each forming a substantially 45° angle with said axis (21); each said reflecting surface (33, 34) defining a respective said reflected beam (35, 36) extending through respective said lens means (37, 38) so as to be focused at a respective focal point (F).

3. A device as claimed in claim 1,
characterised by the fact that said second supporting means comprise a hollow drum (24) coaxial with said axis (21) and having a substantially cylindrical lateral wall (25) supporting said lens means (37, 38), and an end wall (27) fitted with said reflecting means (33, 34).

4. A device as claimed in claim 1,
characterised by the fact that it also comprises dimming means (42) for intercepting said reflected beam (35, 36) when said respective focal point (F) is outside said cutting station (16).

5. A device as claimed in claim 1, characterised by the fact that it also comprises dimming means (43, 50) for intercepting said main beam (22) when said focal point (F) of said reflected beam (36, 37) is outside said cutting station (16).

6. A device as claimed in claim 5, characterised by the fact that said dimming means (43 or 50) comprise a disc (45 or 51) turning about a second axis parallel to said axis (21) and having at least one opening (46, 47 or 52, 53) moving with said disc (45 or 51) along a trajectory intercepting said main beam (22).

7. A device as claimed in claim 6, characterised by the fact that the length of said opening (46, 47 or 52, 53), measured along its trajectory, is a function of the length of said respective transverse cuts (2 or 5, 7).

8. A device (8 or 49) for transversely and at least partially cutting a strip (1 or 4 or 6) traveling continuously along a predetermined route, said device (8 or 49) comprising feeding and guide means (10) for feeding and guiding said strip (1 or 4 or 6) along said route and through a cutting station (16); the feeding and guide means (10) comprising a suction roller (11) for feeding said strip (1 or 4 or 6) through said cutting station (16); said roller (11) presenting peripheral grooves (15 or 54) over which said strip (1 or 4 or 6) extends longitudinally at said cutting station (16); and a cutting unit (18) for successively making a series of at least partial transverse cuts (2 or 5, 7) through said strip (1 or 4 or 6); said cutting unit (18) comprising a laser source (9) for emitting a main laser beam (22); a cutting head (23); and first supporting means (19) to which said cutting head (23) is connected so as to rotate about an axis (21) substantially parallel to said beam (22); said cutting head (23) comprising reflecting means (33, 34) for receiving said beam (22) and forming at least one reflected transverse beam (35, 36); lens means (37, 38) for focusing said reflected beam (35, 36) at a focal point (F); and second means (24) for supporting said reflecting means (33, 34) and said lens means (37, 38); said second supporting means (24) rotating about said axis (21) so as to move said focal point (F) along an annular trajectory (40), the plane of which intersects the route of said strip (1 or 4 or 6) at said cutting station (16), and forms a given angle with a line intersecting the route of said strip (1 or 4 or 6).

9. A device as claimed in claim 8 characterised by the fact that said reflecting means comprise two reflecting surfaces (33, 34) perpendicular to each other and each forming a substantially 45° angle with said axis (21); each said reflecting surface (33, 34) defining a respective said reflected beam (35, 36) extending through respective said lens means (37, 38) so as to be focused at a respective focal point (F).

10. A device as claimed in claim 8 characterised by the fact that said second supporting means comprise a hollow drum (24) coaxial with said axis (21) and having a substantially cylindrical lateral wall (25) supporting said lens means (37, 38), and an end wall (27) fitted with said reflecting means (33, 34).

11. A device as claimed in claim 8 characterised by the fact that it also comprises dimming means (42) for intercepting said reflected beam (35, 36) when said respective focal point (F) is outside said cutting station (16).

12. A device as claimed in claim 8 characterised by the fact that it also comprises dimming means (43, 50) for intercepting said main beam (22) when said focal point (F) of said reflected beam (36, 37) is outside said cutting station (16).

13. A device as claimed in claim 12 characterised by the fact that said dimming means (43 or 50) comprise a disc (45 or 51) turning about a second axis parallel to said axis (21) and having a least one opening (46, 47 or 52, 53) moving with said disc (45 or 51) along a trajectory intercepting said main beam (22).

14. A device as claimed in claim 13 characterised by the fact that the length of said opening (46, 47 or 52, 53), measured along its trajectory, is a function of the length of said respective transverse cuts (2 or 5, 7).

15. A device (8 or 49) for transversely and at least partially cutting a strip (1 or 4 or 6) traveling continuously along a predetermined route, said device (8 or 49) comprising means (10) for feeding and guiding said strip (1 or 4 or 6) along said route and through a cutting station (16); and a cutting unit (18) for successively making a series of at least partial transverse cuts (2 or 5, 7) through said strip (1 or 4 or 6); said cutting unit (18) comprising a laser source (9) for emitting a main laser beam (22); a cutting head (23); first supporting means (19) to which said cutting head (23) is connected so as to rotate about an axis (21) substantially parallel to said beam (22); said cutting head (23) comprising reflecting means (33, 34) for receiving said beam (22) and forming at least one reflected transverse beam (35, 36); lens means (37, 38) for focusing said reflected beam (35, 36) at a focal point (F); second means (24) for supporting said reflecting means (33, 34) and said lens means (37, 38); said second supporting means (24) rotating about said axis (21) so as to move said focal point (F) along an annular trajectory (40), the plane of which intersects the route of said strip (1 or 4 or 6) at said cutting station (16), and forms a given angle with a line intersecting the route of said strip (1 or 4 or 6); and dimming means (43, 50) for intercepting said main beam (22) when said focal point (F) of said reflected beam (36, 37) is outside said cutting station (16).

16. A device as claimed in claim 15 characterised by the fact that said dimming means (43 or 50) comprise a disc (45 or 51) turning about a second axis parallel to said axis (21) and having at least one opening (46, 47 or 52, 53) moving with said disc (45 or 51) along a trajectory intercepting said main beam (22).

17. A device as claimed in claim 16 characterised by the fact that the length of said opening (46, 47 or 52, 53), measured along its trajectory, is a function of the length of said respective transverse cuts (2 or 5, 7).

* * * * *